United States Patent [19]

Andrew

[11] 4,421,303

[45] Dec. 20, 1983

[54] COOLING TOWERS

[75] Inventor: Sydney P. S. Andrew, Hartlepool, England

[73] Assignee: Imperial Chemical Industries PLC, London, England

[21] Appl. No.: 326,413

[22] Filed: Dec. 1, 1981

[30] Foreign Application Priority Data

Dec. 10, 1980 [GB] United Kingdom ............... 8039610

[51] Int. Cl.³ .............................................. B01D 47/00
[52] U.S. Cl. .......................... 261/109; 261/DIG. 11; 55/259
[58] Field of Search .................. 55/259; 261/111, 110, 261/DIG. 11, 109

[56] References Cited

U.S. PATENT DOCUMENTS 3,795,388 3/1974 Toth ........................... 261/DIG. 11
3,982,914 9/1976 Grimble ..................... 261/DIG. 11

FOREIGN PATENT DOCUMENTS 594863 1/1978 Switzerland .
2046422A 11/1980 United Kingdom ....... 261/DIG. 11

Primary Examiner—Bernard Nozick
Attorney, Agent, or Firm—Cushman, Darby & Cushman

[57] ABSTRACT

Cross-flow cooling tower with perforate member to catch wind borne spray from the packings.

4 Claims, 1 Drawing Figure

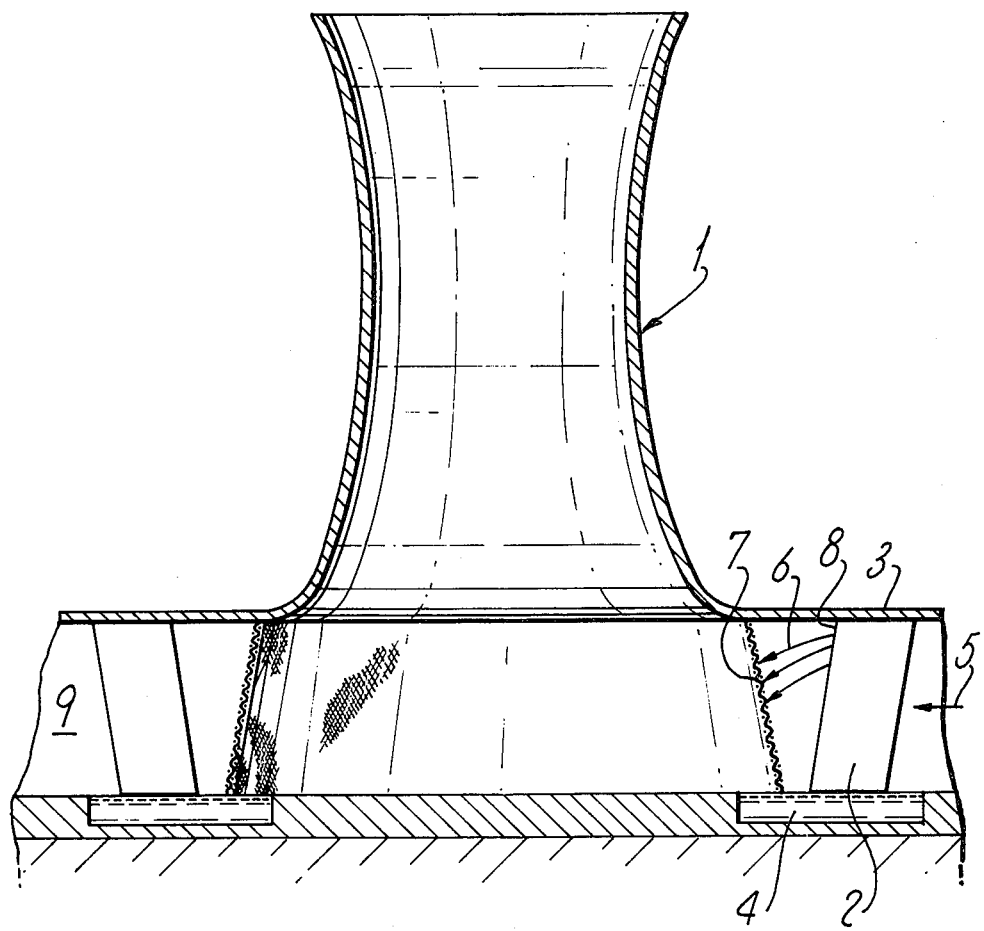

COOLING TOWERS

This invention relates to cooling towers and in particular to cooling towers of the cross-flow type wherein air flows essentially horizontally through a packing down which the liquid, e.g. water, to be cooled is flowing. Such towers are often relatively large structures, usually circular in plan, having the packing disposed as an annulus around a central chimney or tower which serves to create the draught to cause air flow radially inwards through the packing.

We have found however that such cooling towers are liable to inefficient operation under windy conditions. Under such conditions, the wind causes a significant amount of the liquid to be blown inwards away from the packing on the weather side of the cooling towers, so reducing the amount of liquid contacting the packing and hence reducing the cooling efficiency.

We have devised a self-regulating assembly whereby this problem is overcome.

According to the present invention a cross-flow cooling tower having the packing disposed as an annulus around a central chimney is provided with a perforate sheet-like member extending across the air flow path inside the space enclosed by the inner perimeter of said annulus and adjacent to, but spaced from, said packing.

Where the wind blows the liquid off the packing, the resultant spray is carried to the perforate member where it is temporarily held up, e.g. by surface tension, thereby partially blocking the perforations in the perforate member. This partial blockage of the air flow path causes a reduction in the air flow and hence the amount of spray produced will be reduced. This gives rise to more efficient cooling.

To this end the individual perforations in the perforate member preferably have an area within the range 0.01 to 1 cm$^2$. Preferably they have a maximum dimension within the range 0.1 to 2 cm, particularly below 1 cm. Most preferably the maximum dimension is within the range 0.2 to 0.5 cm. The total area of the performations in the perforate member is preferably at least 50%, particularly at least 75% of the total area of the perforate member; i.e. the degree of obscuration is less than 50%, particularly less than 25%. The perforate member may be, for example, a wire or plastic mesh or a perforate plate.

The perforate member is positioned within the space enclosed by the inner perimeter of the annular packing array: it is preferably spaced from the inside of the packing by a distance of 15 to 500 cm. It will be appreciated that the annular region containing the packing need not in fact be circular in plant but may be of any suitable shape, e.g. polygonal such as hexagonal or octagonal, and the term annulus should be construed to include packing arrays having such non-circular perimeters.

In order to provide a more uniform air flow path, in a preferred form of the invention the perforate member is formed in sections disposed one above the other with drainage means interposed between the sections. The spray encountering, and flowing down, section of the perforate member may thus be drained therefrom instead of flowing on to a lower section of the perforate member where it would further block the perforations and hence further reduce the effective air flow path through that lower section.

One embodiment of the invention is illustrated with reference to the accompanying drawing which is a diagrammatic vertical cross section of a cooling tower in accordance with the invention.

The cooling tower has a central chimney or tower 1 around which is disposed an annular region in which a suitable packing 2, e.g. inclined slats, is disposed. Liquid to be cooled is fed to the tope of the packing 2, i.e. at 3, and trickles down the packing 2 to a pond 4.

In the absence of a strong wind, air is drawn radially inwards through packing 2 and up the tower 1 in the normal manner by convection currents caused by the air heated by the liquid rising up the tower 1. When a wind is blowing, e.g. as indicated by arrow 5, liquid is blown off the packing 2 as an inwardly directed spray which encounters a wire mesh 7 disposed about 150 cm from the interior perimeter 8 of the packing 2. Typically the wire mesh has an obscuration of 20% and has perforations of 3 mm width and 3 mm height. The liquid encountering the mesh 7 partially blocks the perforations thus reducing the air flow. This reduces the amount of spray blown off the packing. In the absence of the wind, e.g. on the lee side 9 of the tower, the mesh presents little restriction on the air flow.

I claim:

1. A cross-flow cooling tower having a packing down which the liquid to be cooled flows disposed as an annulus around a central chimney characterised by a perforate sheet member in which the individual perforations have an area within the range of 0.1 to 1 cm$^2$, and a maximum dimension in the range 0.1 to 2 cm, and the total area of the perforations is at least 50% of the total area of the perforate sheet member, said sheet member extending across the air flow path inside the space enclosed by the inner perimeter of said annulus and adjacent to, but spaced from, said packing such that, as the air flow through said packing increases thereby tending to blow liquid flowing down the packing off the packing as a spray, the degree of obscuration of said perforated sheet member increases as a result of said spray encountering said perforate sheet member partially blocking said perforations thereby blocking the air flow path.

2. A cross-flow cooling tower as claimed in claim 1 characterised in that the individual perforations in the perforate sheet member have a maximum dimension below 1 cm.

3. A cross-flow cooling tower as claimed in claim 1 characterised in that the perforate sheet member is a wire or plastic mesh.

4. A cross-flow cooling tower as claimed in claim 1 characterised in that the perforate sheet member is spaced from the inside of the packing by a distance of 15 to 500 cm.

* * * * *